Aug. 24, 1943.   A. S. MACKEY   2,327,915
SEAL
Filed Jan. 2, 1942

INVENTOR
A.S. MACKEY.
BY
ATTORNEYS

Patented Aug. 24, 1943

2,327,915

UNITED STATES PATENT OFFICE 2,327,915

SEAL

Alexander S. Mackey, Ottawa, Ontario, Canada

Application January 2, 1942, Serial No. 425,421

4 Claims. (Cl. 292—324)

This invention relates to seals and is particularly designed for use as a poultry band.

It is an object of the present invention to provide a simplified form of seal which will be tamper proof and which may be secured without the use of instruments of any kind.

A further object of the invention is to provide a seal of this character which is readily adaptable as a poultry band and may be easily slipped around the leg of a bird and locked in a simple operation.

A still further object of the invention is to provide a device of this character with a casing and automatic locking apparatus in which the casing and locking apparatus is not bulky and will not protrude from the circumference of the seal to any great extent.

A further object of the invention is to provide a device of this character which will fit snugly around the leg of a bird and avoid inwardly protruding parts.

A still further object of the invention is to provide a device of this character which is economical to manufacture and which employs a split ring for locking purposes wherein the said ring is held in a simple manner against dislodgment until the seal has been locked.

With these and other objects in view the invention generally comprises a band carrying a casing on one end, housing a tongue receiver including a channel forming rib and a split ring normally spread and held in position between the rib and the band, the housing having an inlet opening aligned with the rib-like member, the opposite end of the band forming a tongue having a rib designed to pass through said opening and telescope into the channel of the first rib, the second rib being designed to dislodge the split ring to cause its free ends to pass through the telescoped ribs as described in detail in the following specification taken in conjunction with the accompanying drawing.

Referring to the drawing—

A indicates the seal as a whole which is made up of a band 10, the ends of which are designed to interlock with one another to form a seal, ring-like in character. One end of the band 10 takes the form of a tongue 11 which is formed with a rib 12 running longitudinally of the tongue and formed preferably by depressing the tongue on one side.

Figure 1:
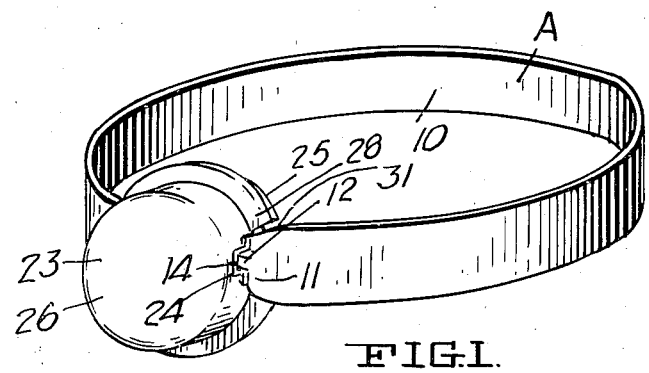
Fig. 1 is a perspective view of a locked seal according to the present invention.
Figure 2:
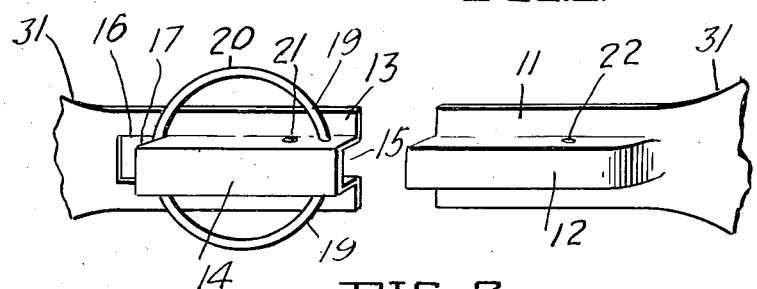
Fig. 2 is an enlarged fragmentary perspective detail of the ends of the band of the seal showing them in position ready to be brought into engagement with one another.

The opposite end of the band takes the form of a tongue receiver 13 which is also formed with a channelled rib 14 depressed from one side of the band and extends longitudinally thereof. The channelled portion 15 of the rib 14 is of a cross sectional area such as to permit the rib 12 of the tongue to slide therewithin so that when the tongue receiver 13 and the tongue 11 are disposed in substantially aligned relation with one another as shown in Fig. 2, the rib 12 will telescope in the rib 14.

The rib 14 of the tongue receiver 13 is shorter than the rib 12 of the tongue and is open at both ends so that the rib 12 may slide in the channel 15 and when fully engaged therein will project beyond the inner end of rib 14. In this connection a portion of the tongue receiver rearwardly of the rib member 14 is recessed at 16 to accommodate the longer rib.

The inner end of the rib 14 is undercut, or in other words, cut to slope inwardly as at 17 to form in effect with the adjacent portion of the tongue receiver a notch 18. This manner of cutting or forming the end of the rib 14 has a particular function. For instance, the rib 14 is designed to be engaged by the free ends 19 of a split ring 20, the free ends normally being designed to engage the side walls of the rib 14 under pressure, in advance of an orifice located in each of the side walls of this rib and in alignment with one another. In this position a portion of the split ring diametrically opposite to the split is positioned in the notch 18 in engagement with the flat surface of the tongue receiving portion 13 of the band. Thus, the ring 20 is held firmly in the position shown in Fig. 2 so as to withstand any possibility of accidental dislodgment.

When the rib 12 of the tongue 11 is projected into the channel 15 of rib 14 to the full extent the free end of rib 12 will project into the recess 16 and in the course of reaching that position will engage that section of the ring 20 disposed in the notch 18 and cause the ring to slide with the moving tongue 11 until the free ends 19 of the ring register with the orifices 21 into which they will then project. Moreover, since the rib 12 is provided with orifices 22 on each of its side walls and aligned with one another and since the orifices 22 are positioned at a point to register with the orifices 21 in member 14 when the tongue 11 has been projected into the tongue receiver to its full extent, the split ring will also pass through the rib-like member 22, thus locking the tongue and tongue receiver together.

Figures 5, 6:
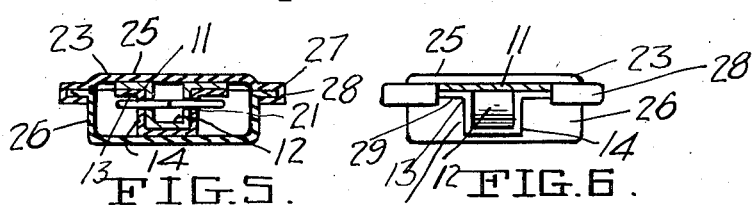
Fig. 5 is a transverse section taken through the casing with the ends of the band locked together showing the split ring functioning as the locking member.
Fig. 6 is a section taken on the line 6—6 of Fig. 4.

The tongue receiver 13 is designed to be housed within a casing 23 which is permanently secured to the tongue receiving portion of the band 10 and designed to enclose the tongue receiver 13 completely except for an inlet opening 24 (see Fig. 6 particularly) of a cross section to permit entry of the rib 12 and the portions of the tongue projecting laterally from it.

The casing 23 is made up of two parts, namely, a base 25 and a body 26 of suitable cross section here shown as circular. The base 25 and body 26 are formed with peripheral flanges 27 and 28 respectively, designed to be clinched together by suitable dies so that these two parts may be firmly secured together around the tongue receiver such that they cannot be disengaged without showing that the seal has been tampered with.

The base 25 is designed to be spaced from the base of the tongue receiver 13 a distance substantially corresponding to the width of the band so as to permit the lateral portions of the tongue 11 to pass into the casing. Correspondingly, the inlet opening 24 which is formed in the body 26 of casing 23 is formed with a slot 29 which intersects the main area of the inlet opening 24 designed to permit passage of the rib 12. The rearward part of the body 26, however, is only provided with a slot 30 (see Figs. 3 and 4) corresponding to the slot 29 so as merely to permit passage of the band 10.

The width of the slots 29 and 30 is such as to accommodate a portion of the band 10 narrower than the normal width of the band, it being noted that the tongue 11 and the tongue receiver 13 are reduced in width compared with the width of the body of the band, the reduction in width being illustrated at 31 so as to form between the main body of the band and these portions a slope, shoulder or the like. Thus, when the base 25 and body 26 of the casing 23 are positioned over the tongue receiving portion 13 of the band and then clinched firmly together the casing 24 is firmly held on the tongue receiving portion against axial movement, and particularly along the band since the slope 31 prevents any possibility of movement towards the body of the band which might cause dislodgment of the ring from its set position. Moreover, if any axial play in the direction of the end of the tongue receiver were to develop, this would be prevented on locking of the band by engagement of the sloped edges of the tongue with the edges of the accessible opening.

This type of construction permits the use of a relatively small flat casing and by reason of the fact that the flat base portion 25 of the casing is positioned on the inside of the band there is practically no inwardly projecting parts which might otherwise render the seal rather impractical for use as a poultry band. Similarly since the construction is such as to provide for a relatively low flat casing there is little outward projection on the seal which might otherwise make the construction objectionable for use as a poultry band.

When the tongue 11 and tongue receiver 13 are engaged and locked together within the casing 23 they are permanently secured together and cannot be dislodged for the reason of the fact that the steel ring will withstand breakage and cannot be tampered with without completely mutilating the casing since the inlet opening 24 which includes the slot 29 is substantially completely filled by the rib 12 and laterally projecting portions of the tongue so as to obviate the possibility of instruments being introduced to the casing to break the seal.

Figure 3:
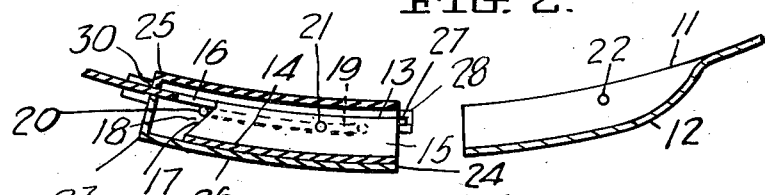
Fig. 3 is a longitudinal section taken through the parts shown in Fig. 2 but with the casing applied to one end of the band.
Figure 4:
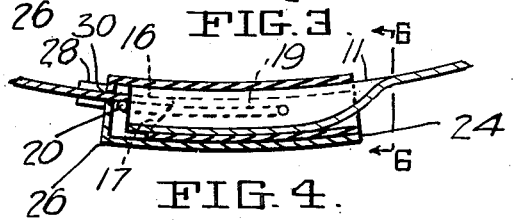
Fig. 4 is an enlarged longitudinal section taken through the engaged ends of the band within the casing of the seal.

It will be noted that the tongue receiver and the tongue including their rib-like formations are slightly curved as shown in Fig. 3 so that when the seal is locked the band forms a complete ring which will neatly encircle the leg of a bird where the device is employed as a poultry band.

What I claim as my invention is:

1. A seal forming an endless ring when locked comprising a band having a locking tongue at one end and a tongue receiver at the opposite end designed to be positioned in opposed relation to one another for slidable engagement to form, when engaged, a continuous ring-like seal, said locking tongue and tongue receiver being formed with channelled ribs telescopically engageable, said rib on the tongue receiver being shorter than that of the tongue and being open at its inner and outer ends, a split ring carried by the tongue receiver, having free ends normally engaging the sides of the latter's rib, a section of said ring extending across the inner open end of said rib and engageable by the rib of the tongue to dislodge the ring upon full engagement of said ribs, the latter having orifices in their sides registering with one another upon full engagement of the ribs and disposed in the path of the free ends of the ring, said orifices receiving the free ends of the ring when dislodged and a casing enclosing the tongue receiver having an accessible opening adjacent to the outer end of the tongue receiver.

2. A seal as claimed in claim 1, in which the casing is formed in two parts, one a relatively shallow base portion underlying the tongue receiver and its rib, the other a body portion greater in depth than the base and fitting over the rib of the tongue receiver and the latter, said body portion being slotted diametrically opposite to the accessible opening sufficiently to allow passage of the band, said parts being peripherally flanged, said flanges being clinched together to form a unitary casing, said tongue receiver having means engaging the casing preventing movement thereof axially of the band.

3. A seal as claimed in claim 1, in which the casing and rib-like members are curved.

4. A seal as claimed in claim 1, in which the tongue receiver is slotted beyond the inner end of its rib to receive the leading end of the rib on the tongue when the tongue and the tongue receiver are engaged.

ALEXANDER S. MACKEY.